J. WOLNY.
BEET MACHINE.
APPLICATION FILED JAN. 19, 1918.

1,339,874.

Patented May 11, 1920.
3 SHEETS—SHEET 3.

Witness

Inventor
J. Wolny
By C. A. Snow & Co.
Attorneys

UNITED STATES PATENT OFFICE.

JOSEPH WOLNY, OF CARNEYVILLE, WYOMING.

BEET-MACHINE.

1,339,874. Specification of Letters Patent. Patented May 11, 1920.

Application filed January 19, 1918. Serial No. 212,675.

*To all whom it may concern:*

Be it known that I, JOSEPH WOLNY, a citizen of the United States, residing at Carneyville, in the county of Sheridan and State of Wyoming, have invented a new and useful Beet-Machine, of which the following is a specification.

It is the object of the present invention to provide a machine embodying novel means for removing the tops of beets, and embodying novel means for deflecting the tops.

In the accompanying drawings:—

Figure 1:
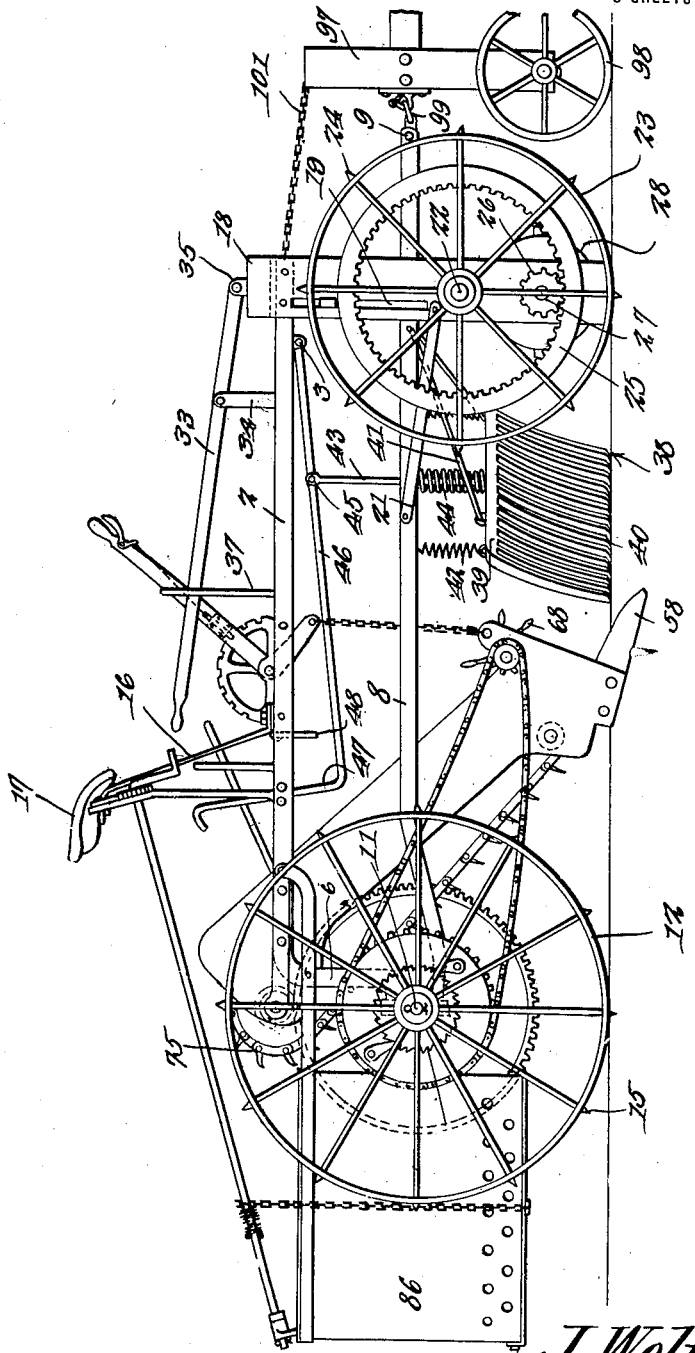
Figure 1 shows in side elevation, a machine constructed in accordance with the invention.
Figure 2:
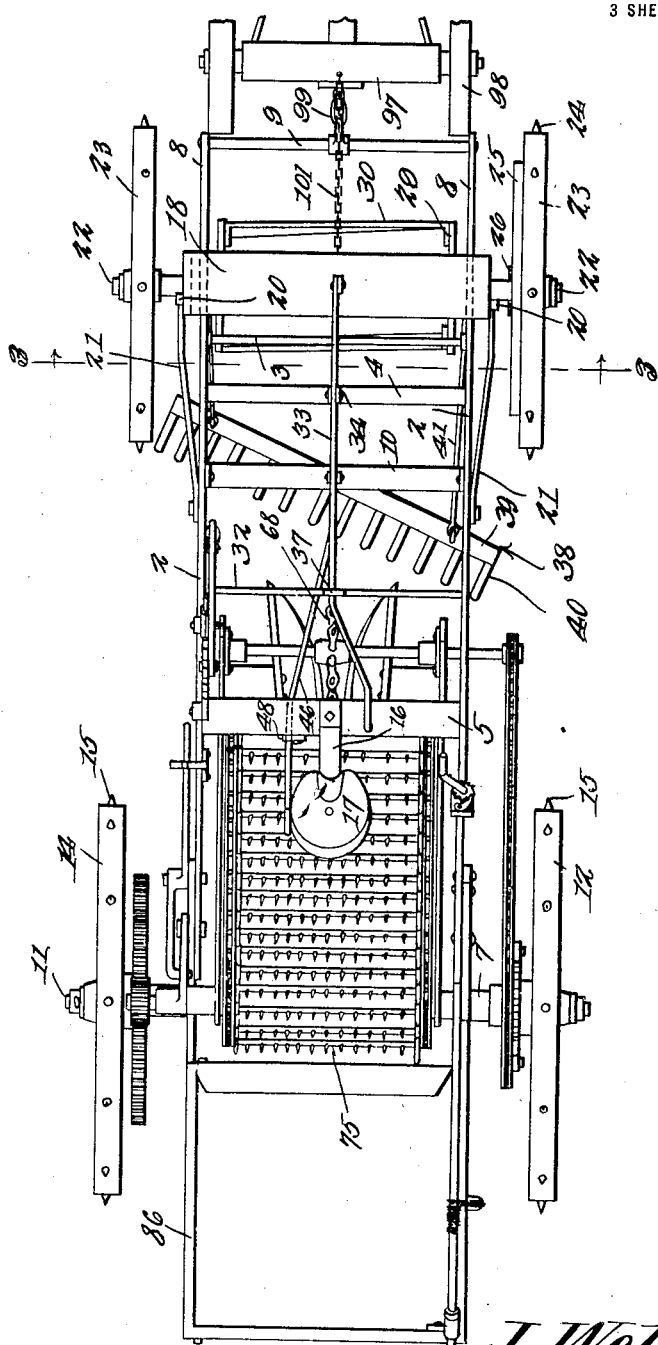
Fig. 2 is a top plan of the machine.

In carrying out the present invention there is provided a main frame which may be constructed variously, without jeopardizing the utility of the machine. The main frame may include a U-shaped head member 1, shown best in Fig. 3. Rearwardly extended top bars 2 are secured at their forward ends to the head member 1, the top bars being connected by a rod 3, by a bar 4 located to the rear of the rod, and by a brace 5 disposed at the rear of the cross bar. The top bars 2 may be connected, further, by a transverse bar 32 disposed between the brace 5 and the cross bar 4. The top bars 2 of the main frame have downwardly extended rear ends 6, shown in Fig. 5, and to these ends of the top bars, bearings 7 are connected. The forward ends of bottom bars 8 are secured to the head member 1, the rear ends of the bottom bars being connected to the bearings 7, as Fig. 5 will disclose. The bottom bars 8 project forwardly beyond the head member 1, as seen in Fig. 2, and are connected by a forward rod 9. A cross bar 10 connects the bottom bars 8 and is located at some distance to the rear of the forward rod 9.

Figure 3:
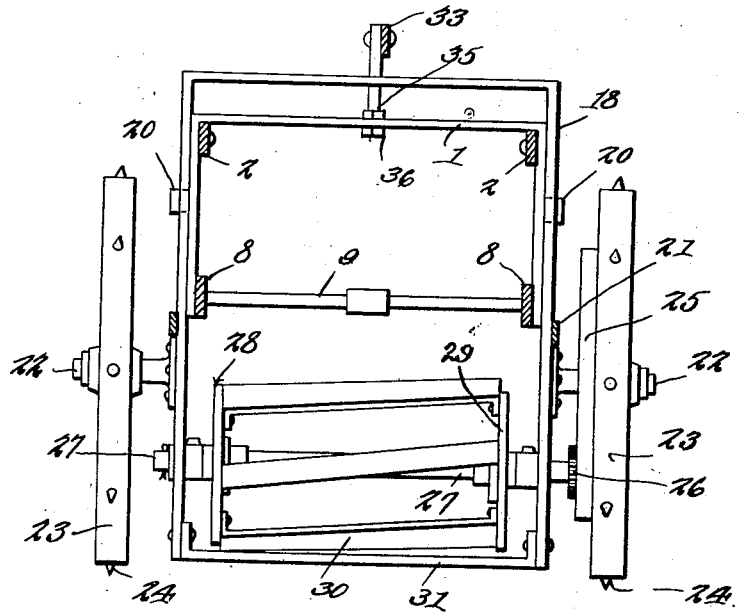
Fig. 3 is a cross section taken approximately on the line 3—3 of Fig. 2, remote parts being omitted.

An axle 11 is journaled for rotation in the bearings 7, a ground wheel 12 being mounted rotatably on the axle, and a suitable means (hereinafter described) being provided, whereby the ground wheel is operatively connected with the axle to aid in imparting a forward rotation thereto. A ground wheel 14 is secured to the axle 11, the wheels 12 and 14 being disposed on opposite sides of the main frame. The wheels 12 and 14 are supplied with spurs 15 which enhance the hold of the wheels upon the ground. A post 16 is carried by the brace 5 and supports a seat 17. The head member 1 is adjustable vertically in a loop-shaped frame 18 seen to best advantage in Fig. 3, the frame having elongated guide slots 19 receiving slidably, projections 20 which extend outwardly from the side portions of the head member 1. The frame 18 is sustained by means of braces 21, the forward ends of the braces being attached to the frame, and the rear ends of the braces being attached to the bottom bars 8 of the main frame of the machine. The loop shaped auxiliary frame 18 carries outwardly extended axles 22 on which ground wheels 23 are journaled, the ground wheels being supplied with traction spurs 24. An internal gear 25 is secured to one of the ground wheels 23, to rotate therewith, and coacts with a pinion 26 secured to a shaft 27 journaled in the frame 18. A topping member 28 is secured to the shaft 27 within the contour of the frame 18 and embodies, as shown in Figs. 3 and 8, end heads 29 and blades 30 connecting the heads, the bottom portion of the frame 18 forming a foot 31 wherewith the blades coact when the top member 28 is rotated.

It will be understood that when the ground wheels 23 rotate, one of them will rotate the internal gear 25, which coöperating with the pinion 26, will rotate the shaft 27 and the topping member 28, the blades 29 shearing off the tops of the beets.

The forward end of the main frame, including the head member 1 and the bars 2 and 8 are vertically adjustable in the frame 18, as hereinbefore stated, and for a purpose to be set forth hereinafter. In order that this vertical adjustment may be accomplished, a lever 33 is fulcrumed intermediate its ends on a post 34 carried by the cross bar 4. A rod 35 is pivoted at its upper end to the forward end of the lever 33 and slides in the top portion of the frame 18, the lower end of the rod 35 being attached at 36 to the top of the head member 1. The lever 33 extends rearwardly to a point adjacent the seat 17 and is held in adjusted positions by engagement with a keeper 37 mounted on the bar 32. A person occupying the seat 17 may tilt the lever 33 on its fulcrum post 34, the rod 35 sliding vertically in the frame 18 and raising and lowering the forward end of the main frame which, as hereinbefore defined, includes the bars 2 and 8 supported on the axle 11, and the head member 1 whereunto the bars are connected.

Figure 4:
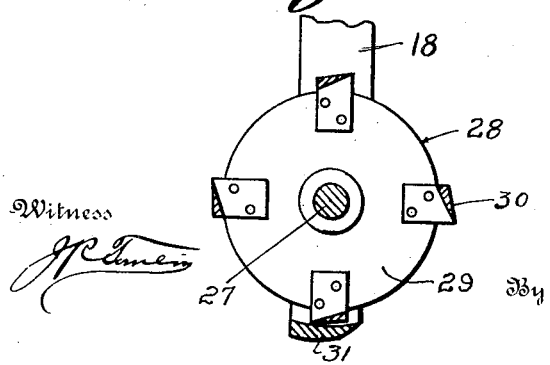
Fig. 4 is a vertical section taken through the topping member.

After the tops of the beets have been cut off by the rotary member 28, it is desirable to sweep the tops laterally, and with this end in view, there is provided a deflector 38 disposed, as shown in Fig. 2, at an acute angle to the line of advance of the machine. The deflector 38 embodies a top bar 39 and depending rake teeth 40. The deflector 38 is sustained at an acute angle to the draft line by means of connections 41, the rear ends of which are pivoted to the top bar 39, the forward ends of which are pivoted to the bottom bars 8 of the main frame. The deflector 38 is sustained by means of retractile springs 42 having their lower ends united with the top bar 39, the upper ends of the springs being attached to the bottom bars 8 of the main frame. The lower end of a supporting rod 43 is assembled with the top bar 39 of the deflector, the rod being mounted for vertical reciprocation in the cross bar 10 which connects the members 8 of the main frame. A compression spring 44 surrounds a portion of the rod 43 and is interposed between the top bar 39 of the deflector 38 and the cross bar 10, the function. The upper end of the supporting rod deflector 38 in a yieldably depressed position. The upper end of the supporting rod 43 is pivoted at 45 to a lever 46 extended longitudinally of the machine and fulcrumed at its forward end upon the rod 3 which connects the top bars 2. The lever 46 extends rearwardly to a point adjacent the seat 17, and terminates in an upstanding arm 47. A retainer 48 is carried by the brace 5 as indicated in Fig. 4. The severed beet tops are engaged by the deflector 38 and are carried laterally. An operator may raise and lower the deflector by swinging the lever 46 on its fulcrum 3, it being possible for a person occupying the seat 17 to grasp the arm 47, swing the lever 46, and seat the lever in the retainer 48, the deflector 38 being held in an elevated position under such circumstances. When the deflector 38 is lowered, the spring 44 keeps the deflector yieldably depressed and in proper relation to the surface of the soil.

The numeral 97 marks a truck whereby the structure may be towed along the field, the truck 97 embodying ground wheels 98. The truck 97 is connected at 99 with the rod 9 which unites the forward ends of the bars 8, and a flexible element 101 may connect the upper portion of the truck with the upper part of the main frame of the machine.

The tops of the beets are cut off by the rotary member 28 and are swept aside by the deflector 38. A shoe 58 digs the beets, and a feeder 68 carries them upon a conveyer 75. The conveyer 75 deposits the beets in a dumping receptacle 86.

Having thus described the invention, what is claimed is:—

1. In a device of the class described, a main frame; ground wheels journaled on the rear end of the main frame; a vertical auxiliary frame on the forward end of the main frame and including a bottom portion forming a foot; a rotary topper journaled on the auxiliary frame coöperating with the foot; ground wheels journaled on the auxiliary frame; and means for operatively connecting one of the ground wheels with the topper.

2. In a device of the class described, a main frame; ground wheels journaled on the rear end of the main frame; a vertical auxiliary frame mounted on the forward end of the main frame; a shaft journaled in the auxiliary frame; a topper carried by the shaft; ground wheels journaled on the auxiliary frame; an internal gear carried by one of the last specified ground wheels; and a pinion on the shaft, the pinion meshing into the internal gear.

3. In a device of the class described, a wheel-mounted frame; a topper carried by the forward end of the frame; a deflector located at the rear end of the topper; mechanism under control of an operator for raising the deflector; spring means for depressing the deflector; and spring means for sustaining the deflector yieldably against downward movement.

4. In a device of the class described, a wheel-mounted frame; a topper mounted on the forward end of the frame; a rod mounted to reciprocate vertically in the frame; a deflector carried by the lower end of the rod and disposed at the rear of the topper; a compression spring on the rod, between the deflector and the frame; and means assembled with the rod and under the control of an operator, for raising the deflector.

5. In a device of the class described, a wheel-mounted frame; a topper carried by the forward end of the frame; a rod mounted to reciprocate vertically in the frame; a deflector on the lower end of the rod and disposed to the rear of the topper; retractile springs connected with the end portions of the deflector and with the frame; a compression spring on the rod and interposed between the deflector and the frame; and means under the control of an operator and connected with the rod for raising the deflector.

6. In a device of the class described, a wheel-mounted frame; a topper carried by the forward end on the frame; a lever fulcrumed on the frame and under the control of an operator; a rod pivotally assembled with the lever and slidably mounted in the frame; a deflector on the lower end of the rod and disposed to the rear of the topper; a compression spring on the rod, and interposed between the frame and the deflector; and connections pivoted at their rear ends to the end portions of the deflector and having their forward ends assembled with the frame in advance of the deflector.

In testimony that I claim the foregoing as my own, I have hereto affixed my signature in the presence of two witnesses.

JOSEPH WOLNY.

Witnesses:
W. J. SKEW,
R. O. SAMUELS.